April 15, 1930.   R. H. COWDERY ET AL   1,755,159
FISHING ROD AND METHOD OF MAKING SAME
Filed March 9, 1927
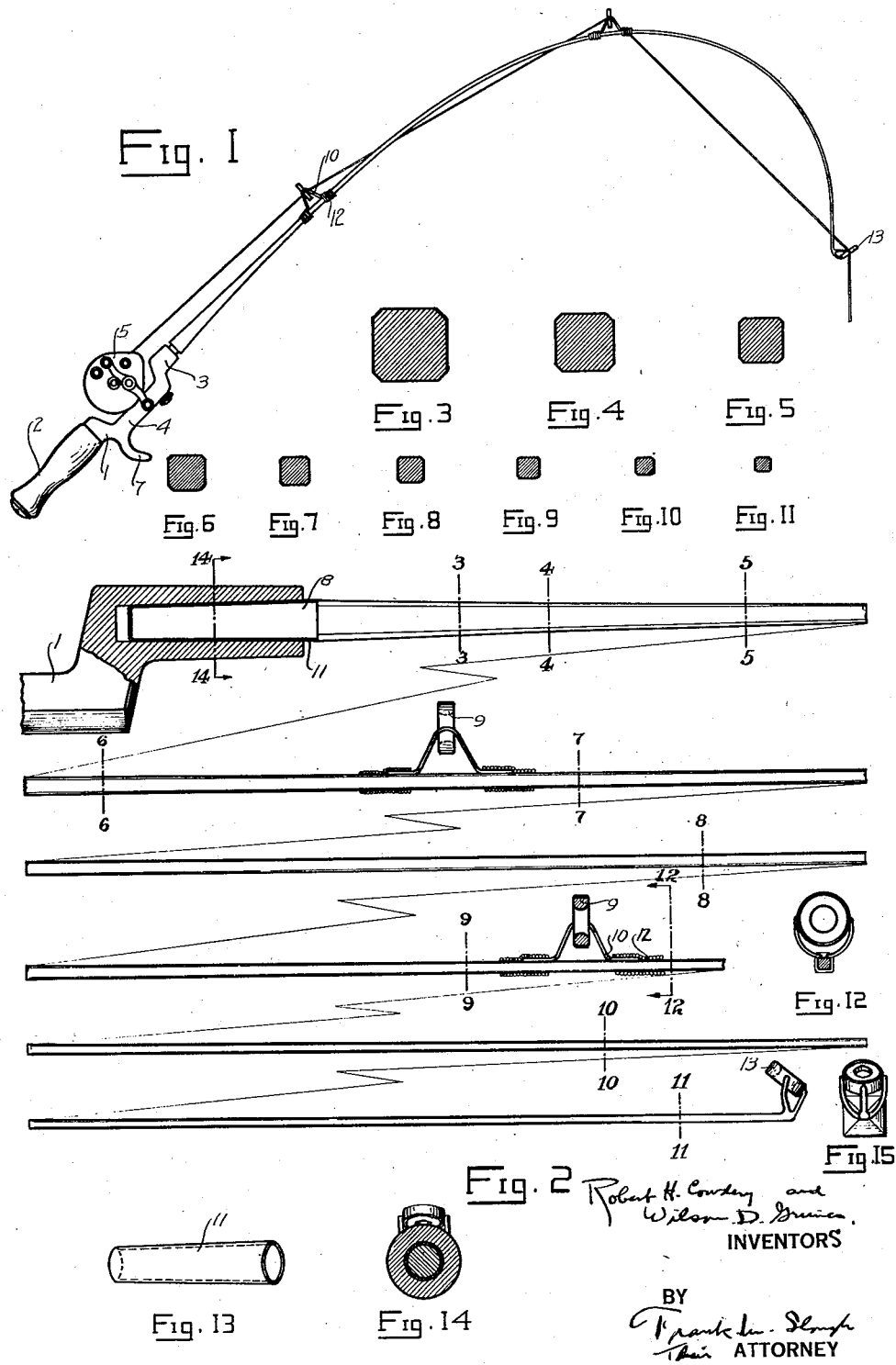

Patented Apr. 15, 1930

1,755,159

UNITED STATES PATENT OFFICE

ROBERT H. COWDERY, OF GENEVA, AND WILSON D. GRIMES, OF CLEVELAND, OHIO, ASSIGNORS TO THE AMERICAN FORK & HOE COMPANY, OF CLEVELAND, OHIO, A CORPORATION OF OHIO

FISHING ROD AND METHOD OF MAKING SAME

Application filed March 9, 1927. Serial No. 173,864.

Our invention relates to improvements in metallic fishing rods and methods of making the same and more particularly it relates to that type of fishing rod employed for "casting" purposes.

One of the objects of our invention is to provide a rod of the type referred to which possesses the qualities of strength and flexibility to a high degree.

Another object of our invention is to provide fishing rods of the above referred to type which will not only withstand considerable "pull" or stress exerted on the same but will also permit torsioning of the rod in withstanding the "pull" or stresses.

Another object of our invention is to provide a rod of this type which is durable in construction as well as being economical to produce in large quantities.

Another object of our invention is to provide a rod of the type referred to which, after being subjected to stresses and torsioning, will return to normal straight unstressed form.

Another object of our invention resides in the provision of a rod of the type herein referred to which is formed from a solid one-piece tapered metallic billet by rolling the blank through forming rolls and tempering it to a maximum degree of hardness without reducing its flexibility.

Another object of our invention is to so form a rod of the type herein referred to that it will not have stiffened portions throughout its length due to joints, but will have "freedom of joints".

Other objects of our invention and the invention itself will be apparent from reference to the following specification of an embodiment of our invention which embodiment is illustrated in the annexed drawings made to scale forming a part of this specification.

Referring to the drawings:

Fig. 1 is a side elevational view of an embodiment of our invention illustrating one of the positions assumed by the rod in use;

Fig. 2 is a side elevational view broken away at intervals, of an embodiment of our invention illustrating the approximate thickness of the same;

Figs. 3 to 11, inclusive, are transverse sectional views of the embodiment of Figs. 1 and 2, taken on the lines 3—3 to 11—11, inclusive, of Fig. 2, the embodiments of these figures enlarged substantially twice the size of Fig. 2 with the ferrules purposely omitted;

Fig. 12 is a transverse sectional view taken on the line 12—12 of Fig. 2 looking in the direction of the arrows;

Fig. 13 is a perspective view of a bushing or ferrule employed in the foregoing embodiment;

Fig. 14 is a transverse sectional view taken on the line 14—14 of Fig. 2 looking in the direction of the arrows; and Fig. 15 is an end elevational view of the foregoing embodiment.

Referring to all the figures of the drawings in all of which like parts are designated by like reference characters at 1, I generally show a metallic fishing rod, at 2 a handle comprising a grip portion 3 at one end thereof, a rod receiving portion 4 at the opposite end, and an intermediate depressed reel supporting portion 5 to which a reel 6 may be detachably secured. The handle 2 is also provided with a depending trigger 7 to facilitate a better grip thereon. The rod receiving portion 3 is preferably provided with a centrally disposed cylindrical tapered socket 8 into which the rod butt is inserted. The butt end of the rod is preferably formed with a tapered portion 9 and a shoulder 10 defining its length and the beginning of the rod taper. A ferrule or bushing 11 preferably of a hollow brass material which conforms to the shape of the socket is forged onto the portion 8 of the rod to provide a frictional surface to more securely retain the rod in the socket of the handle.

The rod 1 preferably comprises a varying tapered solid billet of steel tempered to a high degree and having a maximum flexibility and of great strength. The taper starts at the shoulder 10, at which point the rod is thickest, in a relatively rapid one and continues in such a taper to a point generally defined by the line 5—5 of Fig. 2. From this point to the tip end of the rod the taper becomes a relatively gradual one. The rod is preferably octagonal in its transverse dimensions except the portion 13 adjacent the tip end 14 which is substantially circular in transverse section.

A plurality of guides 15 are secured to the rod at spaced intervals by resilient wire supporting legs 16 having feet 17 bent horizontally therefrom and disposed substantially parallel with the upper face of the rod. A light wire or other suitable material 18 is wound about the feet and rod to form a pocket to retain the guides on the rod without sacrificing flexibility or resiliency of the rod at their points. The guide 19 secured adjacent the end of the rod is preferably supported by a plurality of legs 20 preferably welded to the tip of the rod. Each of the ferrules are preferably lined with a suitable hard vitreous material 30 adapted to reduce friction and wear on the line 21.

We find that a metallic material comprising a major portion of a good grade of iron; from .70 to .75 of one per cent carbon; from .15 to .25 of one percent silica; from .40 to .55 of one per cent manganese; from .80 to .95 of one per cent chromium, and .20 of one per cent vanadium, is highly efficient in a rod of the type heretofore described. Such a composition possesses tensile strength to a high degree which is capable of withstanding torsional strains and at the same time is sufficiently resilient. It is to be understood that we may mix the above ingredients or other ingredients in varying proportions from those enumerated herein.

In forming our rod the above materials are first mixed and formed into an elongated heated steel blank of either rectangular or circular cross section. This blank is then, while heated to a high degree, rolled between a pair of mated gapped rolls being formed with matched peripheral grooves which vary in cross sectional dimensions from one side of the notch or gap in the roller to the other side. This operation lengthens the blank and at the same time the blank assumes a contour in transverse section corresponding to the contour of the grooves of the mated rolls. If desired, a series of rolls may be employed disposed on a horizontal plane or a vertical plane. After the rod has been thus fashioned its butt end and tip end are ground to circular form, heretofore described, whereupon the rod is then heat treated to properly temper the same for tensile strength and resiliency and the ferrules and guides are then placed in their proper places and secured on the rod.

When the rod in use is subjected to a "pull" or stress while it is carried in the handle 1 with the guides standing upright on the rod, the rod will be bent into a curve conforming to a parabola as best shown in Fig. 1. That is, the tip end is curved on a relatively short radius, whereas the greater length of the rod from the point 5—5 to a point defined by the lines 9—9 of Fig. 2, will be curved having a radius relatively large.

The material and the transverse dimensions of the rod will permit it to be flexed under stress to any desired degree without affecting its permanent form, so that the rod will assume normal straight under stressed form when the pull on the same is released. The properties of tensile strength and resiliency are maintained in our rod without the addition of undue weight and large cross sectional dimensions.

The guides for the fishing line are so carried by rod, due to the resilient supporting legs and light wire wrappings, so that it is not reinforced at the points where the guides are carried, and there is no localization of breaking stresses.

Our improved rod having "freedom of joints" will not be affected by localized and breaking stresses and localized weighting so that the rods when used for casting are bent uniformly and are weighted uniformly throughout their length, thereby proper balance is effected.

In casting rods, of the type above described, to secure the best casting results it is well known that the weight should be uniformly distributed in progressively less and less units of weights as the tip end of the rods is approached and should not be localized at points several feet apart, so that they will not be susceptible to tension and will stand twisting strains exerted upon them when bent by a pull upon their tip end varying in lateral directions. Our improved rods are also not unduly stiff because of the small cross sectional dimensions.

Having thus described our invention we are aware that numerous and extensive departures may be made from the embodiment herein illustrated and described but without departing from the spirit of our invention.

We claim:

1. A fishing rod adapted for casting purposes, comprising a single billet of tempered steel, tapered from butt to tip, solid throughout its length, said taper beginning with a relatively more rapid reduction of the cross-sectional area of the rod for a substantial distance from its butt than at points beyond such portion.

2. A casting rod for fishing lines, made of solid tempered steel and continuously tapered, from the handle portion throughout its length, the degree of taper in the portion of its length nearest the handle being much greater than the degree of taper throughout the remainder of the length toward the tip.

In testimony whereof, we hereunto affix our signatures this 4th day of March, 1927.

ROBERT H. COWDERY.
WILSON D. GRIMES.